United States Patent [19]

Bradley, Jr.

[11] 4,032,223

[45] June 28, 1977

[54] OPHTHALMIC DEVICE

[76] Inventor: James B. Bradley, Jr., 110 Monteleon Drive, West Monroe, La. 71291

[22] Filed: May 2, 1975

[21] Appl. No.: 573,907

[52] U.S. Cl. .............................. 351/132; 351/88; 351/137; 351/138

[51] Int. Cl.² ...................... G02C 1/00; G02C 5/02

[58] Field of Search .................. 351/19, 76, 80, 88, 351/131, 132, 137, 138, 154

[56] References Cited

UNITED STATES PATENTS

| 388,545 | 8/1888 | Emerson | 351/76 |
|---|---|---|---|
| 636,595 | 11/1899 | Weaver | 351/76 |
| 3,476,468 | 11/1969 | Fortenberry | 351/138 X |

*Primary Examiner*—Paul A. Sacher
*Attorney, Agent, or Firm*—Norvell E. Von Behren

[57] ABSTRACT

A novel, improved ophthalmic device which comprises a unique fitting eyeglass frame having a removable nosepiece attachment which may be adjusted to permit adjustment of the lens to an exact eyelevel. The removable nosepiece attachment is pivotably connected to the ophthalmic frame, which allows a front-to-rear adjustment of the nosepiece on the ophthalmic frame, and the subject invention provides for a much improved pivotable connection between the nosepiece and the ophthalmic frame which may be rigidly locked in place by the novel use of a shim or friction member in combination with an extention of a female receptacle positioned in each side of the one piece nosepiece. Also disclosed is a device which is utilized for forming the removable nosepiece by forming a molded impression of a portion of a person's nose with the impression being used to then form the nosepiece for the person's eyeglass frames. The molded impression device comprises generally a mold for retaining a predetermined quantity of a molding substance along with a frame for retaining the mold and means for removably attaching the mold to the frame. There is also disclosed the mold for using with the molding device as well as the method for forming a molded impression with a molding substance of a portion of a person's nose for use in forming the removable nosepiece of the subject invention.

3 Claims, 20 Drawing Figures

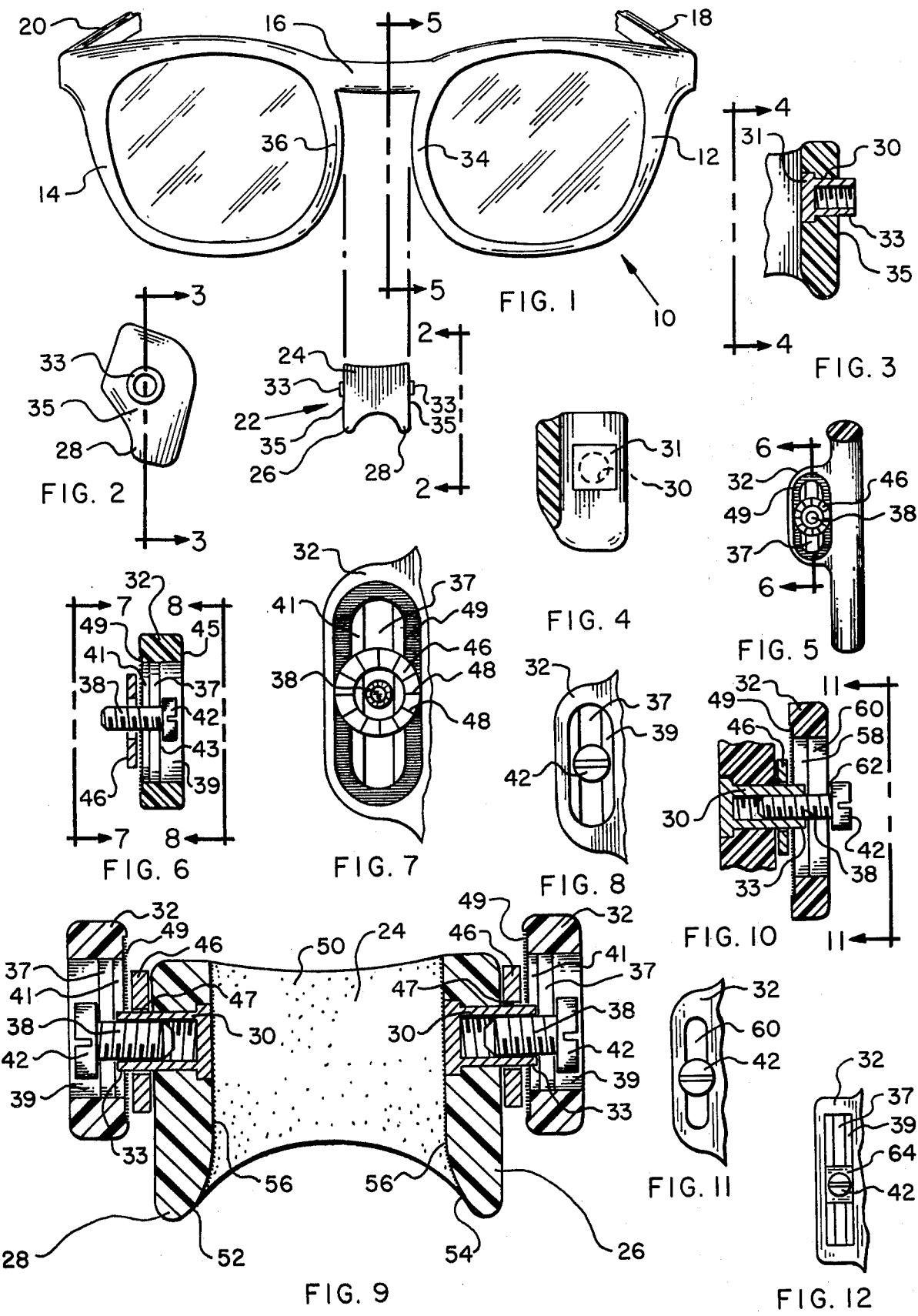

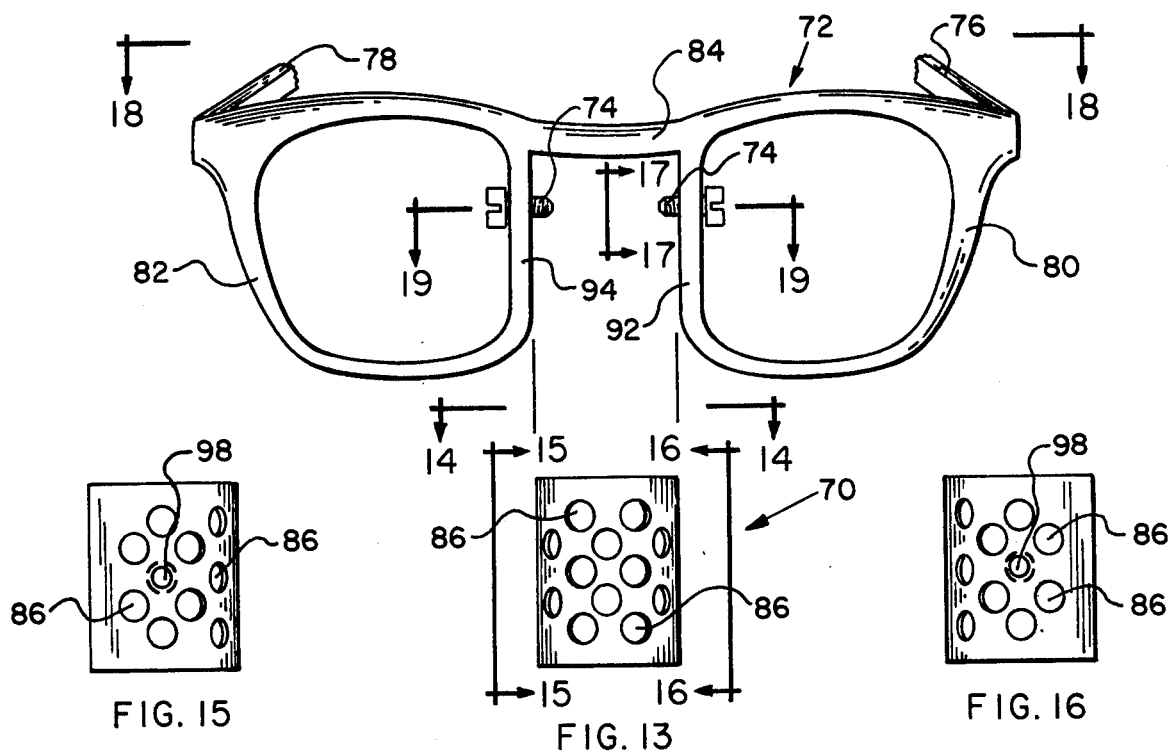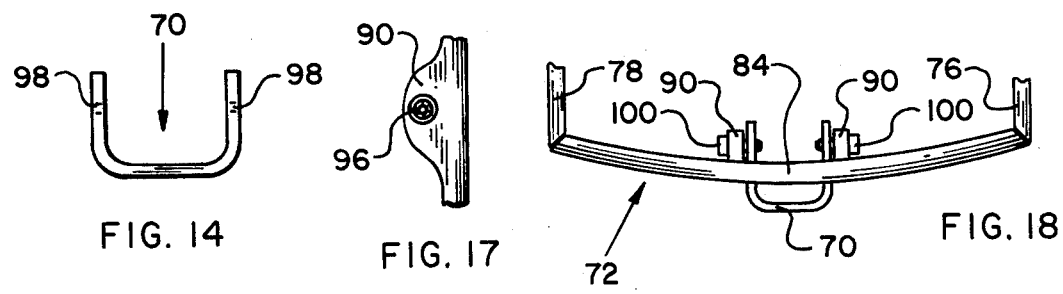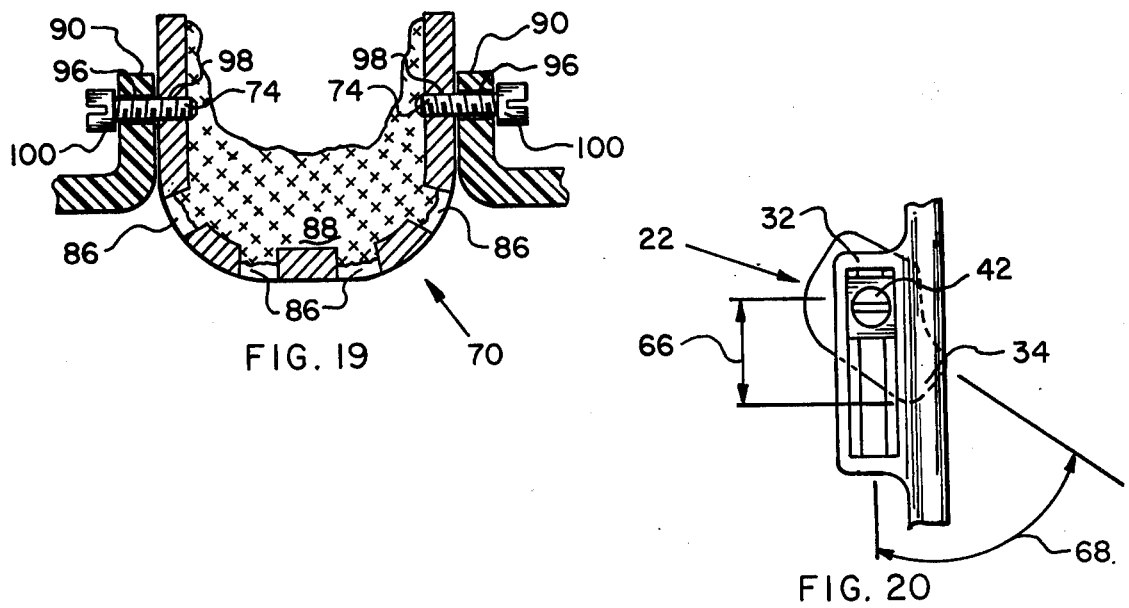

OPHTHALMIC DEVICE

CROSS-REFERENCES TO RELATED APPLICATIONS

U.S. patent application Ser. No. 525,842, filed Nov. 21, 1974 by James B. Bradley, Jr. and entitled "Ophthalmic Device and Method"

BACKGROUND OF THE INVENTION

This invention relates generally to an improved ophthalmic frame and in particular to a new and novel device which may be used by an optometrist or the like to insure a proper fit for each individual patient. The subject invention may be incorporated into the ophthalmic device used by an optometrist or the like and may also be incorporated into the final eyeglass frames which are prescribed by the optometrist or the like.

The usual procedure for the selection and fitting of eyeglasses by an optometrist generally involves a two-step process where in the first step, the user's eyes are checked by an optometrist to ascertain the precise degree of correction required in the lens of the eyeglass. After this has been determined, the patient is generally escorted to a separate sitting room where a large selection of styles and colors of eyeglass frames are shown to him. After a long series of trial and error fittings of the various styles and colors of glasses on the user, the final selection is generally made by the patient and his particular set of glasses are then tailor-made by the optometrist by grinding the prescription formula for the lens and inserting the proper lens in the selected frame.

Such fitting techniques, while many times successful, are not necessarily always successful since standard frames heretofore known generally comprise one of two types which are not necessarily satisfactory for all users. Such frames generally utilize molded nosepieces made of plastic and have a relatively small contact area with the nose, and with no adjustment front-to-rear possible to take into account different size and shaped noses. The other type of nosepiece used with frames generally sold today consists of a floating nosepiece which may be formed as a metal face or sometimes a plastic face.

It should be recognized that these types of nosepiece mounts are often considered uncomfortable and can cause pressure indentations in the skin of the nose which can be unsightly and irritating after a prolonged use of the poorly fit eyeglass. All ill-fitted pair of eyeglasses, such as this, often causes a second problem to the user which is the problem of slippage of glasses on the user's nose which can be very annoying, to say the least. It is felt that such slippage occurs because of poor frictional fit on the nose of the user resulting primarily from the ill-fitted nosepieces on the glasses.

For a more fuller understanding of the prior art type of nosepieces available for glasses, reference should be made to the applicant's co-pending U.S. patent application Ser. No. 525,842, filed Nov. 21, 1974 and entitled, OPHTHALMIC DEVICE AND METHOD. The patents cited in that application, while not considered especially pertinent to that application, were cited for the purpose of showing the extensive state of art and the extensive need for improvement in nosepiece design. In the development of the device covered by the subject patent application, it was thought to be advantageous to provide a more positive pivotable connection between the nosepiece and the nosepiece frame and also to provide in the eyeglass frame a means for adjusting the lens to provide an exact eyelevel position for the eyeglass. In addition, it was thought that there should be provided a new and novel means for molding the removable nosepiece of the subject application.

SUMMARY OF THE INVENTION

There is provided by the applicant's invention a new and improved ophthalmic fitting device which comprises a pair of lens mounts having a bridge and temples attached thereto in combustion with a removable and replaceable nosepiece attachment for positioning between the lens mount and beneath the bridge in combination with means for removably attaching the nosepiece to the device, the removable attachment, being constructed to allow the nosepiece to be pivoted front-to-rear about an axis thereby allowing the user of the device to obtain a comfortable fit of his particular eyeglass. The subject removable attachment is also adjustable vertically in an upwardly and downwardly manner to permit alignment of the lens in order to give an exact eyelevel adjustment of the eyeglass lens. The removable nosepiece of the subject invention is a generally inverted U-shaped member which is sized to conform to a person's nose and can have placed thereupon a soft, porous coating which aids in preventing slippage of the eyepiece on the user's nose. The subject device also contains an improved pivotable connection formed by means of an improved female receptacle which is positioned within the nosepiece. The improved pivotable connection insures that a tight non rotation of the nosepiece is assured once the desired degree of front-to-rear positioning is obtained. This is assured by the new and novel use of the shim or friction member used between the nosepiece and the lens mount lugs in combination with the extension of the female receptacle through the shim as described hereinafter and as shown in the drawing figures. The tight non rotation of the one piece nosepiece after tightning of the screws is also aided by the use of an abraded surface on the inner surfaces of the facing lugs formed in the lens mounts. By the use of the new and novel molding device taught herein and the new and novel mold as well as the method for forming a molded impression of a portion of a person's nose, the optometrist is able to provide a much improved and much more precisely fitted eyeglass frame than has been heretofore possible with prior art eyeglass frames.

Accordingly it is an object of the invention to provide a new and novel device for use by an optometrist or the like which aids him in alleviating the problems encountered in the fitting of prior art type eyeglass frames.

Another object of the invention is to provide a new and novel removable nosepiece attachment which allows for vertical adjustment of the nosepiece thereby permitting alignment of the lens of the eyeglass frame to an exact eyelevel which is comfortable to the patient.

These and other objects and advantages of the invention will become apparent from a study of the drawings attached herewith and from a reading of the description of the preferred embodiment to be described more fully hereinafter.

BRIEF DESCRIPTION OF THE DRAWINGS

FIG. 1 is a front view of the subject ophthalmic frame showing the nosepiece attachment exploded from the frame;

FIG. 2 is a side view taken along line 2—2 of FIG. 1 showing the general configuration of the nosepiece attachment;

FIG. 3 is a partial sectional view taken along line 3—3 of FIG. 2 showing the improved female receptacle of the subject invention, which will be described more fully hereinafter, imbedded in the nosepiece body;

FIG. 4 is a side view taken along line 4—4 of FIG. 3;

FIG. 5 is a partial sectional view taken along line 5—5 of FIG. 1 showing the vertical adjustment of the nosepiece provided by a vertical slot in the eyeglass frame;

FIG. 6 is a sectional view taken along line 6—6 of FIG. showing in detail the screw and shim attachment in place in the eyeglass frame;

FIG. 7 is an enlarged view taken along line 7—7 of FIG. 6;

FIG. 8 is a side view taken along line 8—8 of FIG. 6;

FIG. 9 is an enlarged sectional view of the nosepiece shown attached to the eyeglass frame and showing the mating parts in their respective positions;

FIG. 10 is an enlarged partial sectional view similar to the right-hand side of FIG. 9 showing a modification of the basic invention wherein the head of the mounting screw, positioned in the female receptacle, is positioned on the outside of the lug formed on the eyeglass frame, as will be described more fully hereinafter;

FIG. 11 is a partial side view taken along line 11—11 of FIG. 10;

FIG. 12 is a view similar to FIG. 8 showing a modification of the basic invention;

FIG. 13 is a front view of the subject molding device showing the mold attachment exploded from the frame;

FIG. 14 is a top view taken along line 14—14 of the mold shown in FIG. 13;

FIG. 15 is a side view of the mold shown in FIG. 13 taken along line 15—15 of FIG. 13;

FIG. 16 is a side view of the mold shown in FIG. 13 taken along line 16—16 of FIG. 13;

FIG. 17 is a view taken along line 17—17 of FIG. 13;

FIG. 18 is a top view taken along line 18—18 of FIG. 13;

FIG. 19 is an enlarged sectional view taken along line 19—19 of FIG. 13 showing the mold positioned on the eyeglass frame; and FIG. 20 is an enlarged view similar to the view shown in FIG. 12 showing a nosepiece attachment positioned on the eyeglass frame and showing the vertical adjustment relative to the nosepiece and the angular adjustment of the nosepiece relative to the frame.

DESCRIPTION OF THE PREFERRED EMBODIMENT

Referring now to the drawings in general and in particular to FIGS. 1 and 2 of the drawings, there is shown in FIG. 1 an ophthalmic frame of the subject invention, shown generally by the numeral 10, which comprises a pair of lens mounts 12 and 14, having a bridge 16 spanning the lens mounts and rigidly attached thereto. On each side of the lens mounts 12 and 14, as is well known in the art, are a pair of temples 18 and 20 which are fixedly attached to the lens mounts and are pivotably mounted on hinges not shown in the drawing.

Positioned below the frame 10 and shown exploded in FIG. 1 is a removable and replaceable nosepice attachment 22 which may be positioned between the lens mounts 12 and 14 and beneath the bridge 16. The nosepiece attachment 22 is removably attached to the lens mounts and may be pivoted about the lens mounts and may also be raised or lowered on the lens mounts as will be described more fully hereinafter. The pivoting of the nosepiece 22 is accomplished by the use of a plurality of female receptacles or locking nuts imbedded in the nosepiece in combination with a plurality of screws positioned in a protruding portion or lug to the rear of the lens mounts as will be described more fully hereinafter. The vertical adjustment of the nosepiece is accomplished by the use of an elongated slot positioned in the protruding portion or lug to the rear of the lens mounts.

The nosepiece 22 may be formed of plastic or some other suitable material and is formed as a generally inverted U-shaped member having an upstanding portion 24 and two downwardly protruding and outwardly extending legs 26 and 28 of whatever length required for the best frictional advantage with the entire nosepiece 22 being formed by the method taught hereinafter and by the device also taught hereinafter to conform to the bridge of the user's nose. By referring to FIG. 2 of the drawing, there is shown a side view taken along line 2—2 of FIG. 1 showing the general configuration of the side of the removable nosepiece 22.

Referring now to FIGS. 3 and 4, there will be described the before-mentioned improved female receptacles or locking nuts imbedded in each side of the nosepiece 22. The upstanding portion 24 has imbedded therein on each side thereof a female receptacle 30 which may generally be formed of brass or some other suitable material and is imbedded in the nosepiece portion during the manufacturing process and by means well known in the art. As is shown more fully in FIG. 4 of the drawing, the head 31 of the female receptacle 30 is generally square or rectangular shaped to prevent turning of the receptacle whenever the mating screw is positioned in the receptacle as will be more fully described hereinafter. The female receptacle 30 is positioned in the upstanding portion 24 of the nosepiece 22 in such a manner that the end 33 of the receptacle protrudes a predetermined distance beyond the edge surface 35 of the nosepiece 22, a distance which would make possible the snapping of the female receptacle into place by the slight bending of the eyeglass frames.

Referring now to FIGS. 5–8 of the drawing, there will be described in more detail the mating screw portion of the pivotable mounting which is utilized in combination with the female receptacle 30 to provide front-to-rear adjustability of the nosepiece 22 as well as the vertical slot in the lens mount which is used to provide adjustment upwardly and downwardly of the nosepiece in the lens mount. FIG. 5 of the drawing is a side view taken along line 5—5 of FIG. 1 showing a protruding portion or lug 32 which is formed to the rear of the vertical section 34 of the lens mount 12. In a similar manner, but not shown in the drawing, a similar protruding portion would be formed in the vertical section 36 of the lens mount 14. The lugs 32 would be formed integrally with the formation of the lens mounts 12 and 14 and would be preferably molded in place and would be sized of a sufficient size to receive the adjusting screws which are positioned in the female receptacles 30. The lugs 32 have formed vertically therein an elongated slot 37 as well as an elongated slot 39 and a further elongated slot 41. The slots 37, 39 and 41 are sized to receive the adjusting screw 38 which is positioned within the lug as shown in FIG. 6 of the drawing with its head 42 resting on the exposed surface 43 formed between the slot 37 and the slot 39. When positioned in this manner the head 42 would be preferably positioned entirely within the slot 39 so that no portion of the head was exposed beyond the outer surface 45 of the lug 32. By the use of the slot 37, it can be readily seen that the nosepiece 22 is adjustable upwardly and downwardly on the lugs 32, thereby permitting alignment of the lens to the exact eye level of the patient.

Positioned on the outside of the screws 38 is a washer or shim 46 which has a plurality of radially raised surfaces or teeth 48 formed on both sides thereof and is more fully shown in FIG. 7 of the drawing. The function of the radially raised surfaces or teeth 48 is to prevent turning of the nosepiece after the optometrist has fit the nosepiece to the desired position on the eyeglass frame which is comfortable to the user and after he has tightened the screws 38 in the female receptacles 30. Since the nosepiece 22 and the protruding lugs 32 may be formed generally of a plastic or metal, the raised teeth 48 on the metallic shim 46 will engage the abraded area on the lug and prevent turning of the nosepiece out of its preferred alignment. In order to assure no turning or movement of the nosepiece, there may also be provided on one side of the lug 32 an abraded surface 49 shown more fully in FIGS. 5, 6 and 7.

Referring now to FIG. 8 of the drawing, there is shown more fully how the head 42 of the screw 38 is positioned within the slot 37 and is contained within the slot 39 so that no portion of the head 42 protrudes past the outer surface 45 of the lug 32.

Referring now to FIG. 9 of the drawing, there is shown an enlarged sectional view, an assembly of the various pieces and parts hereinbefore described and shown in FIGS. 1–8. FIG. 9 shows the nosepiece attachment 22 positioned between the vertical sections 34 and 36 of the lens mounts 12 and 14 and shows the nosepiece attachment pivotably attached to the vertical section by means of the plurality of screws 38 positioned in the female receptacles 30. As has been described before, the end 33 of the female receptacle 30 is sized to extend slightly past the surface 35 of the nosepiece. As shown in FIG. 9 of the drawing, it extends through the shim 46 through a hole 47 provided in the shim and into the elongated slot 41 contained on the lug 32. By extending the end of the receptacle 33 in this manner, it can be seen that the screw thread 38 is able to be engaged a greater distance in the female receptacle 30 thereby providing for a more positive locking of the nosepiece 22 to the eyeglass frame. It can also be readily seen that front-to-rear adjustment is obtainable on the nosepiece 22 by pivoting the nosepiece on the screw 38 until a comfortable fit is obtained and then simply tightening the screws 38 in the female receptacles 30 or locking nuts until a tight fit is obtained against the shims 46. By the use of the elongated slots 37, 39 and 41, a vertical adjustment is obtainable also in the nosepiece which permits alignment of the lens of the eyeglass to be the exact eye level desired by the patient.

In the preferred embodiment the inner surface or the surface of the nosepiece 32 which is touching the bridge of the user's nose may be coated with a soft, porous material for a more comfortable fit. The soft, porous material or frictional means may be a plastic, rubber or some other suitable material which is preferably sprayed on the exposed area to aid in preventing slipping of the nosepiece on the user's nose. The soft, porous material also acts as a cushion on the nosebridge to make the eyeglass feel better on the user's nose. In FIG. 9 of the drawing, the area which would have the soft, porous frictional material applied thereto is shown by the stippling 50 which would also be applied to the lower surfaces 52 of the leg 28 and the lower surface 54 of the leg 26 as well as the surfaces numerically labeled 56.

Referring now to FIG. 10 and FIG. 11 of the drawing, there is shown in FIG. 10 an enlarged partial, sectional view similar to the right-hand side of FIG. 9 showing a modification of the basic invention, wherein the head of the mounting screw, positioned in the female receptacle, is positioned on the outside of the lug formed on the eyeglass frame. In the modification shown in FIGS. 10 and 11 the lug 32 would be formed with two elongated slots instead of the three elongated slots as shown in the FIG. 9 version. When constructed with two elongated slots the first elongated slot, number 58, would be sized of a sufficient size to receive the end 33 of the receptacle 30 while the elongated slot 60 would be sized of a sufficient size to receive the outside diameter of the screw 38. In this variation, the head 42 would rest against the outer surface 62 of the lug 32. This variation would also use the shim 46 in combination with the abraded surface 49 as has been hereinbefore described.

Referring now to FIG. 12 of the drawings, there is shown a view similar to the view shown in FIG. 8 showing a modification of the variation shown in FIG. 8, wherein the lug 32 is formed with square corners and has formed therein the three elongated slots 41, not shown on the drawing, 37 and 39. Positioned beneath the head 42 of the screw 38 is a flat washer 64 which is sized of sufficient size to rise within the slot 39 and to bear on the surface of the slot 39, thereby providing more bearing surface for the head 42 of the screw 38 as the screw is tightened within the female receptacle 30.

Referring now to FIG. 20 of the drawing, there is shown an enlarged view similar to the view shown in FIG. 12, showing a nosepiece attachment 22 positioned on the eyeglass frame and showing the vertical adjustment relative to the nosepiece and the angular adjustment of the nosepiece relatve to the frame. When the ophthalmic device is constructed with the use of the plurality of elongated slots formed in the lug 32, as has been hereinbefore described, it can readily be seen that the nosepiece 22 is adjustable vertically upwardly and downwardly in the direction shown by the arrow 66 and also is adjustable in an angular direction similar to that shown by the numeral 68. With both of these adjustments possible, it can readily be appreciated that the ultimate user of the ophthalmic device is able to obtain a much improved fit of his eyeglasses on his nose and to his proper eye position than has been heretofore possible.

Referring now to FIGS. 13–19 of the drawings, there is shown a device utilized for forming a molded impression of a portion of a person's nose with the impression being used to form a nosepiece for the person's eyeglass frames which can be utilized in the ophthalmic device shown in FIG. 1 of the drawing. FIG. 13 is a front view of the subject molding device showing the mold attachment exploded from the frame and comprises a mold, shown generally by the numeral 70, which is utilized with a frame, shown generally by the numeral 72, with means for removably attaching the mold to the frame in the form of a plurality of pins 74. The frame 72 has pivotably mounted thereupon a plurality of temples 76 and 78 of the type hereinbefore described and comprises a pair of lens mounts 80 and 82 having a bridge 84 formed therebetween.

The mold 70 is formed in a general U-shaped configuration as shown in FIG. 14 of the drawing and has formed therein a plurality of relief holes 86 which serve as a means to aid in retaining the molding substances 88, shown in FIG. 19, on the mold 70. The relief holes 86 also serve as a means for allowing excess molding substance to be removed from the mold whenever the mold is pressed on the person's nose in forming the impression for the nosepiece. The frame 72 has formed thereon a plurality of lugs 90 which are formed on the vertical portion 92 and 94 in the rear of the frame. The lugs 90 have formed therein a first pair of opposed holes 96 which are drilled and tapped to receive the threaded pin 74 in the manner shown in FIG. 19 of the drawing. The mold 70 has formed thereon a second pair of opposed holes 98 which may also be simply drilled without being tapped in a modification of the device. When formed in this manner, the pin 74, with its knurled head 100, may be utilized as the means for removably attaching the mold 70 to the frame 72. The knurled head 100 on the pin 74 is utilized to allow the optometrist to quickly and easily screw the pin 74 into the holes 96 and 98 in order to attach the mold 70 to the frame 72.

When formed in this manner, the mold 70 is able to receive the molding substance which is utilized to form the impression of the user's nose. The molding substance 88 would be an air-setting, pliable dough-like substance similar to the type of material used by a dentist in forming impressions in dental fixtures. A substance of this type has generally a polysulfide base and is sold on the market under various names, one of which is "Coe-flex" (regular), a rubber base impression material manufactured by Coe Laboratories, Inc., Chicago, Ill., 60658. When utilized with the mold 70, the molding substance would be adhered to the mold 70 and would use the relief holes 86 as a means for retaining the molding substance on the mold. When applied over the user's nose and when forming the impression, the excess molding substance could then be further impressed within the relief holes 86 and after the molding substance had set up, the mold 70 could be removed from the eyeglass frame 72 and could be used then to form a removable nosepiece attachment for the ophthalmic device shown in FIG. 1 of the drawing.

When practicing the method of the subject invention for forming a molded impression with the molding substance of a portion of a person's nose, the optometrist or professional person would provide the mold attached to the eyeglass frame for retaining the molding substance and would then spread a predetermined quantity of the molding substance on the mold. Thereafter the molding device, with the molding substance attached, would be positioned on the person's face and nose with the frame 72 being placed on the user's face with the temples 76 and 78 being placed over the user's ears much in the manner that a normal eyeglass frame would be used. Thereafter the frame 72 would be firmly pressed on the person's nose to make a proper impression of the nose portion of the user and the device would be removed from the person's face and nose after the molding substance has completely hardened, thereby forming the impression of the person's nose. This impression would be utilized in its hardened form to form a nosepiece bridge of the type shown in FIG. 1 of the drawing for use with the person's eyeglass prescription. The transferrng of the impression from the hardened molded substance to form the removable nosepiece of the type used in the ophthalmic device shown in FIG. 1, would be by means well known in the art and forms no part of this invention.

In summary, there has been described in the foregoing patent application a novel, improved ophthalmic device which comprises a unique fitting eyeglass frame having a removable nosepiece attachment which may be adjusted to permit adjustment of the lens to an exact eye level. The elongated slots of the subject invention may be formed approximately three-quarters of an inch in length thereby allowing adjustment in the vertical direction of approximately three-quarters of an inch. The slots may also be sized of a shorter length down to approximately one-quarter of an inch or less if desired. There has also been disclosed a unique molding device and method for molding a removable nosepiece attachment for the subject ophthalmic device which thereby allows a much improved fit on the ophthalmic device on the user's nose.

From the foregoing, it becomes apparent that all of the objects and advantages of the invention have been obtained by the new and novel device and method hereinbefore described as the preferred embodiment, however it should be apparent that many changes can be made in the arrangement of parts and steps of the method without departing from the spirit and scope of the invention as described in the following claims. 9n Having described my invention, I claim:

1. An ophthalmic device comprising
   a. a pair of lens mounts, each lens mount having a lug formed thereon, said lugs each having a pair of colinear juxtaposed vertical slots formed therein to allow for vertical adjustment of a nosepiece a wider one of the two slots on each lug being on the interior side thereof;
   b. a bridge, spanning said lens mounts and rigidly attached thereto;
   c. a pair of temples, hingedly attached to said lens mounts;
   d. a removable and replaceable one piece nosepiece positioned between said lens mounts and beneath said bridge;
      1. a pair of female receptacles imbedded fixedly in said nosepiece, the female receptacles extending outward from the sides of said nosepiece into the wider of the two slots in said lens mount lugs to retain the nosepiece between the lens mounts;
      2. a pair of screws each extending through the other of the two slots in said lens mount lugs and into the female receptacles;
      3. a frictional member positioned between said lens mount lugs and said nosepiece for frictionally restraining relative rotational movement between said one piece nosepiece and said lens mounts whenever said screws are tightened in said female receptacles; and
      4. said female receptacles also extending through said frictional members.

2. The ophthalmic device as defined in claim 1 wherein the length of said elongated slots are approximately three-quarters of an inch.

3. An ophthalmic device as claimed in claim 1 wherein therein is a third slot co-linear and co-extensive with the first two slots in each of the lens mount lugs and wherein a flat washer is received in each of said third slots with the respective screw extending therethrough.

* * * * *